United States Patent [19]
Reck et al.

[11] Patent Number: 6,114,464
[45] Date of Patent: Sep. 5, 2000

[54] THERMOSETTING AQUEOUS COMPOSTIONS

[75] Inventors: Bernd Reck, Grünstadt; Eckehardt Wistuba, Bad Dürkheim; Wilhelm Friedrich Beckerle, Bobenheim-Roxheim; Jürgen Mohr, Grünstadt; Axel Kistenmacher, Ludwigshafen; Joachim Roser, Mannheim, all of Germany

[73] Assignee: BASF Aktiengesellschaft, Ludwigshafen, Germany

[21] Appl. No.: 09/147,310

[22] PCT Filed: May 28, 1997

[86] PCT No.: PCT/EP97/02796

§ 371 Date: Nov. 25, 1998

§ 102(e) Date: Nov. 25, 1998

[87] PCT Pub. No.: WO97/45461

PCT Pub. Date: Dec. 4, 1997

[30] Foreign Application Priority Data

May 29, 1996 [DE] Germany .................... 196 215 73

[51] Int. Cl.$^7$ ...................................................... C08F 20/00
[52] U.S. Cl. ................................. 525/329.5; 525/328.2; 525/328.9; 525/329.4; 525/329.6; 525/329.9; 428/375; 428/537.5
[58] Field of Search ................................ 427/389.9, 393; 428/375, 537.5; 525/329.5, 328.2, 328.9, 329.4, 329.6, 329.9

[56] References Cited

U.S. PATENT DOCUMENTS

| | | |
|---|---|---|
| 2,550,465 | 4/1951 | Gorski . |
| 2,604,427 | 7/1952 | Armstrong et al. . |
| 2,830,648 | 4/1958 | Haddox . |
| 3,784,396 | 1/1974 | Fourment et al. . |
| 3,878,152 | 4/1975 | Distler et al. . |
| 3,944,690 | 3/1976 | Distler et al. ............................ 427/389 |
| 4,048,422 | 9/1977 | Sackmann et al. . |
| 4,076,917 | 2/1978 | Swift et al. . |
| 4,500,735 | 2/1985 | Diery et al. . |
| 4,505,839 | 3/1985 | Bellos et al. . |
| 4,559,159 | 12/1985 | Denzinger et al. . |
| 4,771,098 | 9/1988 | Siol et al. . |
| 4,839,417 | 6/1989 | Suetterlin et al. . |
| 5,100,582 | 3/1992 | Bhattacharyya . |
| 5,175,361 | 12/1992 | Denzinger et al. . |
| 5,227,446 | 7/1993 | Denzinger et al. . |

FOREIGN PATENT DOCUMENTS

| | | |
|---|---|---|
| 2037214 | 9/1991 | Canada . |
| 75 820 | 4/1983 | European Pat. Off. . |
| 0 116 930 | 8/1984 | European Pat. Off. . |
| 0 354 913 | 10/1988 | European Pat. Off. . |
| 0 445 578 | 9/1991 | European Pat. Off. . |
| 0 567 480 | 8/1992 | European Pat. Off. . |
| 0 583 086 | 2/1994 | European Pat. Off. . |
| 0 651 088 | 5/1995 | European Pat. Off. . |
| 0 672 920 | 9/1995 | European Pat. Off. . |
| 1 243 874 | 7/1967 | Germany . |
| 1 794 341 | 3/1972 | Germany . |
| 2 214 450 | 10/1972 | Germany . |
| 2 501 123 | 7/1976 | Germany . |
| 3 134 222 | 3/1983 | Germany . |
| 3 206 459 | 9/1983 | Germany . |
| 3 620 149 | 12/1987 | Germany . |
| 4 003 172 | 8/1991 | Germany . |
| 1088105 | 10/1967 | United Kingdom . |
| 1116408 | 6/1968 | United Kingdom . |
| WO 88/07980 | 10/1988 | WIPO . |
| WO 92/12940 | 8/1992 | WIPO . |
| WO 93/14147 | 7/1993 | WIPO . |

OTHER PUBLICATIONS

Chemical Abstracts, AN 127:221463w, WO 97/31,059, Aug. 28, 1997.
N. Schönfeld, Grenzflächenaktive Ethylenoxid–Addukte, pp. 29–33, Wissenschaftliche Verlagsgesellschaft mbH, Stuttgart 1976, (With English Abstract).
S.P. McManus, et al., Synthetic Communications, vol. 3, No. 3, pp. 177–180, "The Synthesis of Aminoalcohols from Epoxides and Ammonia", 1973.
D.A. Tomalia, et al., Encyclopedia of Polymer Science and Engineering, Revised Edition, vol. 1, pp. 680–739, "Alkyleneimine Polymers", 1985.
H. Fickentscher, Cellulose Chemie, vol. 13, English Abstract of pp. 58–64, 71, and 74, 1932, Jan., 1999.
Ullmanns Ezyklopädie der technischen Chemie, 4 Ed., vol. 12, pp. 709–727 (Table of Contents), 1976.
Derwent Abstracts, AN 75920W/46, DE 2417–342, Nov. 6, 1975.

*Primary Examiner*—Erma Cameron
*Attorney, Agent, or Firm*—Oblon, Spivak, McClelland, Maier & Neustadt, P.C.

[57] ABSTRACT

Thermally curable mixtures of hydroxyalkylated polyamines and polycarboxylic acids are formaldehyde-free and particularly useful as binders for shaped articles.

22 Claims, No Drawings

THERMOSETTING AQUEOUS COMPOSTIONS

This application is a National Stage of PCT/EP97/02796, filed May 28, 1997.

DESCRIPTION

The present invention relates to aqueous thermally curable compositions of hydroxyalkylated polyamines and polycarboxylic acids and to their use.

Sheetlike fibrous structures, for example fiber webs, shaped articles such as chipboard, etc., are frequently consolidated chemically by means of a polymeric binder. To enhance the strength, especially the wet and heat resistance strengths, binders are frequently used that comprise formaldehyde-eliminating crosslinkers. But this means there is a danger of formaldehyde emissions.

Numerous alternatives to prior art binders have been proposed to avoid formaldehyde emissions. For instance, U.S. Pat. No. 4,076,917 discloses binders comprising carboxylic acid or carboxylic anhydride addition polymers and β-hydroxyalkylamides as crosslinkers. The molar ratio of carboxyl groups to hydroxyl groups is preferably 1:1. The disadvantage is the relatively costly production of the β-hydroxyalkylamides.

EP-A-445 578 discloses sheets composed of finely divided materials, for example glass fibers, in which mixtures of high molecular weight polycarboxylic acids and polyhydric alcohols, alkanolamines or polyacid amines act as binders. The disclosed high molecular weight polycarboxylic acids are polyacrylic acid, copolymers of methyl methacrylate/n-butyl acrylate/methacrylic acid and of methyl methacrylate/methacrylic acid. The polyhydric alcohols and alkanolamines used are 2-hydroxymethylbutane-1, 4-diol, trimethylolpropane, glycerol, poly(methyl methacrylate-co-hydroxypropyl acrylate), diethanolamine and triethanolamine.

EP-A-583 086 discloses formaldehyde-free aqueous binders for producing fiber webs, especially glass fiber webs. The binders comprise a polycarboxylic acid containing at least two carboxylic acid groups with or without anhydride groups. Polyacrylic acid in particular is used. The binder further comprises a polyol, for example glycerol, bis[N,N-di(β-hydroxyethyl)]adipamide, pentaerythritol, diethylene glycol, ethylene glycol, gluconic acid, β-D-lactose, sucrose, polyvinyl alcohol, diisopropanolamine, 2-(2-aminoethylamino)ethanol, triethanolamine, tris(hydroxymethylamino)methane and diethanolamine.

These binders require a phosphorus-containing reaction accelerant to obtain glass fiber webs having adequate strengths. The presence of such a reaction accelerant can only be dispensed with if a highly reactive polyol is used. β-Hydroxyalkylamides are mentioned as highly reactive polyols.

EP-A-651 088 describes corresponding binders for substrates composed of cellulose fiber. For these binders the inclusion of a phosphorus-containing reaction accelerant is mandatory.

EP-A-672 920 describes formaldehyde-free binding, impregnating or coating compositions comprising an addition polymer constituted to from 2 to 100% by weight of an ethylenically unsaturated acid or anhydride as comonomer and at least one polyol. The polyols are substituted triazine, triazinetrione, benzene or cyclohexyl derivatives, the polyol radicals always being located in position 1,3,5 of the rings mentioned. Despite a high drying temperature, these binders provide only low wet breaking strengths on glass fiber webs. Amine-containing crosslinkers and predominantly linear polyols were tested too as part of comparative experiments. It is pointed out that amine-containing crosslinkers have a flocculating effect and that the predominantly linear polyols lead to weaker crosslinking than the cyclic polyols.

DE-A-22 14 450 describes a copolymer containing from 80 to 99% by weight of units derived from ethylene and from 1 to 20% by weight of units derived from maleic anhydride. The copolymer, in powder form or in dispersion in an aqueous medium, is used for surface coating together with a crosslinker. The crosslinker used is an amino-containing polyalcohol. However, to achieve crosslinking, it is necessary to heat up to 300° C.

It is an object of the present invention to provide formaldehyde-free compositions which permit rapid curing at low temperature and impart good mechanical properties to the substrate.

We have found that this object is achieved when polycarboxylic acids are used together with aliphatic compounds containing at least two hydroxyalkyl-substituted amino groups.

The present invention accordingly provides aqueous thermally curable compositions comprising component (1) at least one water-soluble, linear or branched aliphatic compound containing at least two functional amino groups of the structure (a) or of the structure (b)

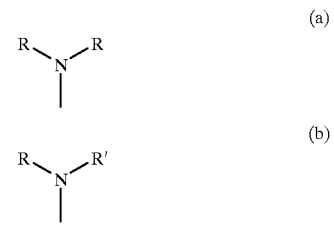

where R is hydroxyalkyl and R' is alkyl, per molecule and component (2) an addition polymer containing from 5 to 100% by weight of units derived from at least one ethylenically unsaturated mono- or dicarboxylic acid and obtainable by free-radical polymerization.

Compound (A) preferably has at least 5 hydroxyalkyl groups.

Alkyl is straight-chain or branched alkyl, preferably $C_1$–$C_{12}$-alkyl, especially $C_1$–$C_6$-alkyl. Examples of alkyl are methyl, ethyl, n-propyl, isopropyl, n-butyl, sec-butyl, isobutyl, t-butyl, n-pentyl, n-hexyl, 2-ethylhexyl, n-decyl and n-dodecyl.

Hydroxyalkyl is straight-chain or branched alkyl with at least one hydroxyl group. Preferably, the hydroxyalkyl group has one hydroxyl group which is attached in the terminal position, in particular. The alkyl radical of the hydroxyalkyl group preferably has the same meanings as indicated above for alkyl. Preference is given to 3-hydroxypropyl, 2-hydroxypropyl and in particular 2-hydroxyethyl.

Cycloalkyl is $C_3$–$C_7$-cycloalkyl, especially cyclopentyl or cyclohexyl.

Alkylene is straight-chain or branched alkylene, preferably $C_2$–$C_{12}$-alkylene, especially $C_2$–$C_8$-alkylene.

Component (1) in the compositions of this invention preferably comprises at least one compound of the formula I

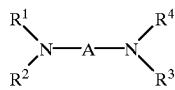 (I)

where
A is $C_2$–$C_{18}$-alkylene, unsubstituted or substituted by one or more groups selected independently of each or one another from the group consisting of alkyl, hydroxyalkyl, cycloalkyl, OH and $NR^6R^7$, where $R^6$ and $R^7$ are independently of each other H, hydroxyalkyl or alkyl, and uninterrupted or interrupted by one or more oxygen atoms and/or $NR^5$ groups, where $R^5$ is H, hydroxyalkyl, $(CH_2)_nNR^6R^7$, where n is from 2 to 5 and $R^6$ and $R^7$ are each as defined above,
or A is a radical of the formula:

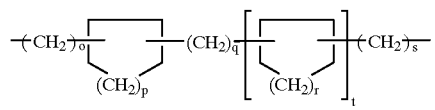

where
o, q and s are each independently of the others 0 or an integer from 1 to 6,
p and r are independently of each other 1 or 2, and
t is 0, 1 or 2,
the radicals

are unsubstituted or substituted by 1, 2 or 3 alkyl radicals, and
$R^1$, $R^2$, $R^3$ and $R^4$ are each independently of the others H, hydroxyalkyl, alkyl or cycloalkyl, the compounds having at least two, preferably at least three, hydroxyalkyl groups per molecule.
Component (1) is particularly preferably:
(1) a compound of the formula Ia

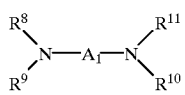 (Ia)

where
$A_1$ is $C_2$–$C_{12}$-alkylene, unsubstituted or substituted by at least one alkyl group and/or at least one $NR^{12}R^{13}$ group, where $R^{12}$ and $R^{13}$ are independently of each other alkyl or hydroxyalkyl, and
$R^8$, $R^9$, $R^{10}$ and $R^{11}$ are each independently of the others hydroxyalkyl or H, or one of $R^8$ and $R^9$ and/or one of $R^{10}$ and $R^{11}$ is alkyl or cycloalkyl.

Particularly useful compounds of this type are the compounds of the following formulae:

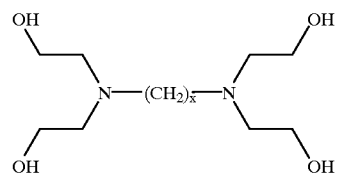

where x is from 2 to 12, in particular 2, 3, 6, 8, 10 or 12,

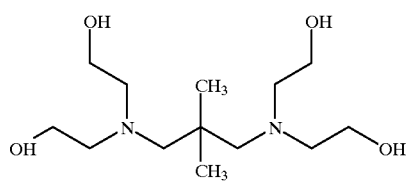

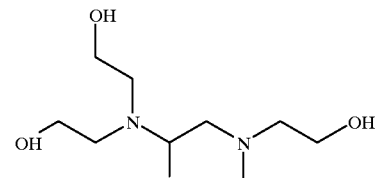

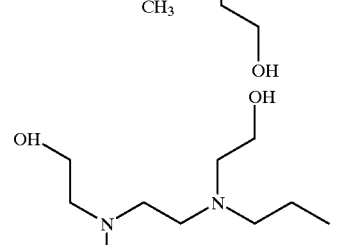

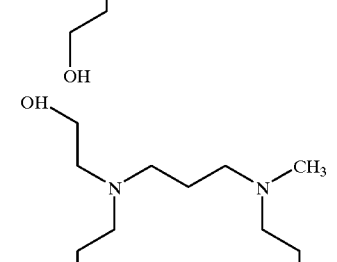

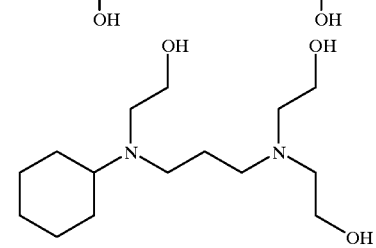

Compounds of the formula Ia also include the aminals of the formula

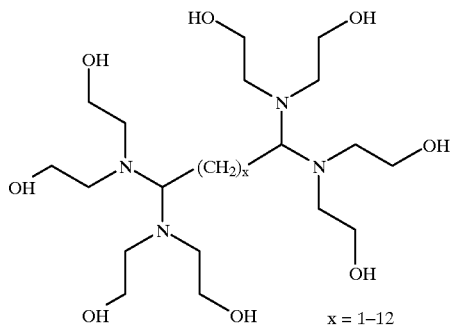

x = 1–12

(2) A compound of the formula Ib

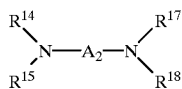
(Ib)

where

A$_2$ is C$_2$–C$_8$-alkylene which is interrupted by at least one NR$^{18}$ group, where R$^{18}$ (or each of the R$^{18}$ radicals independently) is hydroxyalkyl or alkyl, and R$^{14}$, R$^{15}$, R$^{16}$ and R$^{17}$ are each independently of the others hydroxyalkyl or H.

Preferably, A$_2$ is interrupted by one or two NR$^5$ groups. Particularly useful compounds of this type are the compounds of the following formulae:

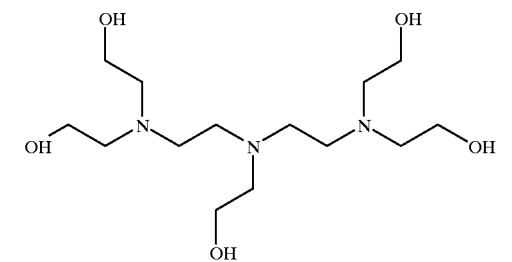

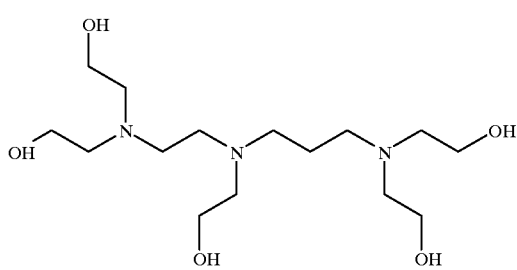

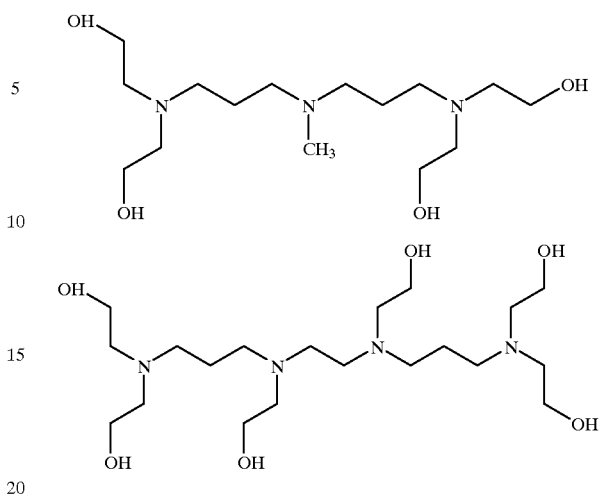

(3) A compound of the formula Ic:

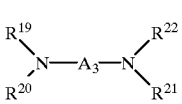
(Ic)

where

A$_3$ is C$_2$–C$_8$-alkylene which is interrupted by at least one NR$^{23}$ group, R$^{19}$, R$^{20}$, R$^{21}$ and R$^{22}$ are each independently of the others alkyl, uninterrupted or interrupted by at least one NR$^{23}$ group and/or unsubstituted or substituted by at least one NR$^{25}$R$^{24}$ group, R$^{23}$ is H, hydroxyalkyl or —R$^{26}$NR$^{25}$R$^{24}$, R$^{24}$ and R$^{25}$ are independently of each other H, hydroxyalkyl or —R$^{26}$NR$^{25}$R$^{24}$, and R$^{26}$ is ethylene or propylene, and (on average) at least 30%, in particular >60%, preferably >80%, of the (hydroxyalkylatable) N atoms bear a hydroxyalkyl group.

The C$_2$–C$_8$-alkylene group is preferably interrupted by at least two NR$^5$ groups. Particularly useful compounds of this type are reaction products of ethylene oxide with polyethyleneimines of different molecular weights having a plurality of structural elements NR$^6$R$^7$ and NR$^5$. Useful polyethyleneimines are those whose weight average molecular weight is within the range from 400 to 2,000,000. The following schematic formula is intended to illustrate the compound of this type:

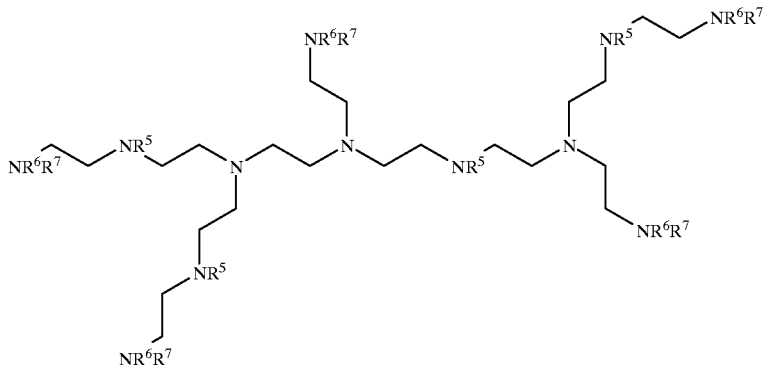

where
- $R^5$ is H, hydroxyethyl or —$R^8NR^6R^7$ and $R^6$ and $R^7$ are each H, hydroxyethyl or —$R^8NR^6R^7$ and $R^8$ is $(CH_2)_2$, on average >40%, in particular >60%, particularly preferably >80%, of the ethoxylatable NH functions of the polyethyleneimine having been reacted with ethylene oxide.

(4) A compound of formula Ie

where
- $A_5$ is $C_6$–$C_8$-alkylene which is interrupted by at least one $NR^{31}$ group, where $R^{31}$ is $(CH_2)_nNR^{33}R^{32}$ or alkyl which is uninterrupted or interrupted by at least one $NR^{31}$ group,
- n is 2 or 3, and
- $R^{27}$, $R^{28}$, $R^{29}$, $R^{30}$, $R^{31}$ and $R^{32}$ are each independently of the others hydroxyalkyl or H.

Particularly useful compounds of this type are polyamines of the formulae:

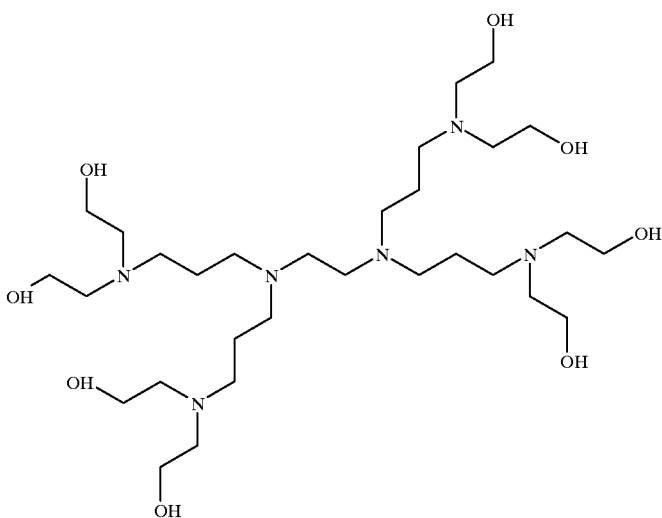

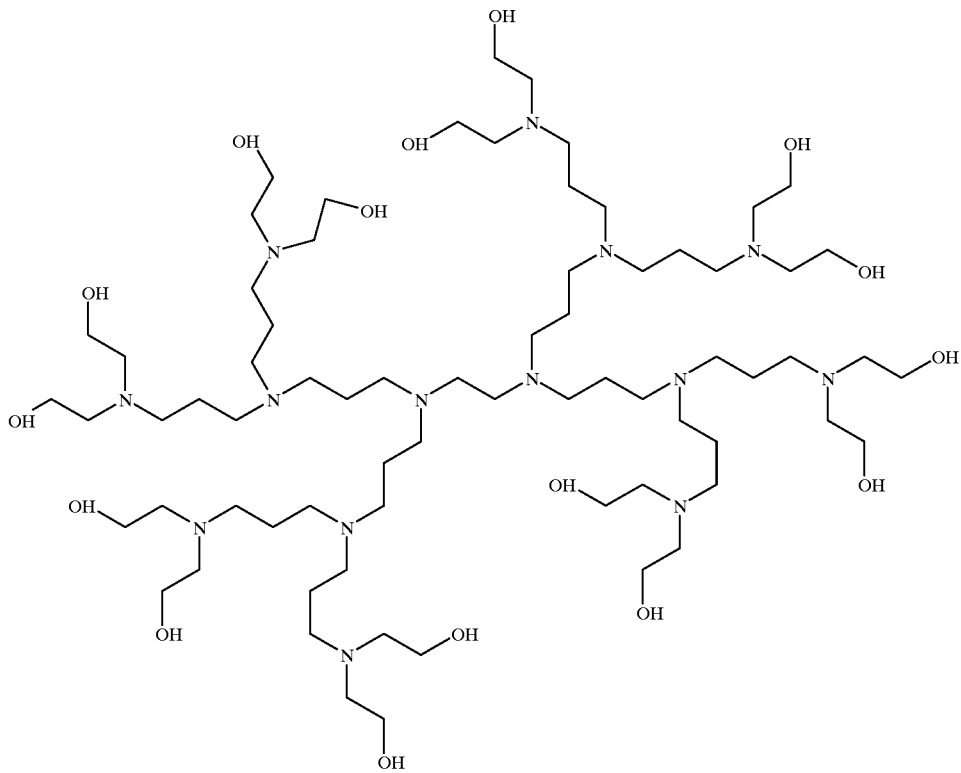
(5) A compound of the formula If
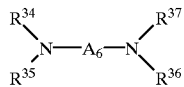
(If)
where
$A_6$ is $C_2$–$C_{12}$-alkylene which is interrupted by at least one oxygen atom, and
$R^{34}$, $R^{35}$, $R^{36}$ and $R^{37}$ are each independently of the others hydroxyalkyl or H.
The alkylene chain is preferably interrupted by 1, 2 or 3 oxygen atoms. Particularly useful compounds of this type are the compounds of the following formulae:
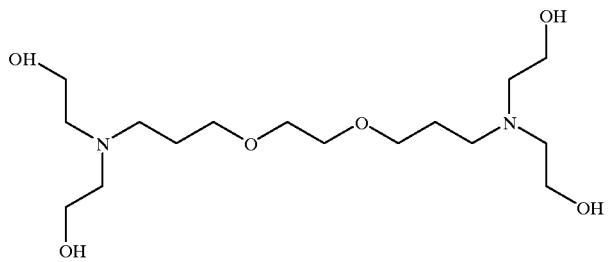

-continued

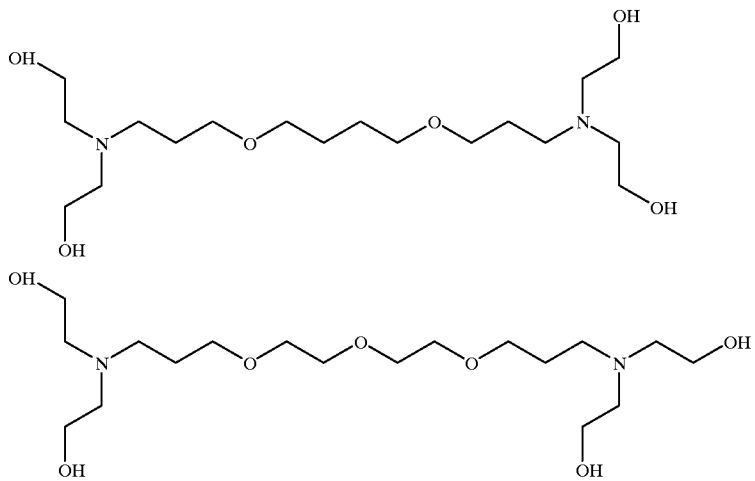

(6) A compound of the formula Ig

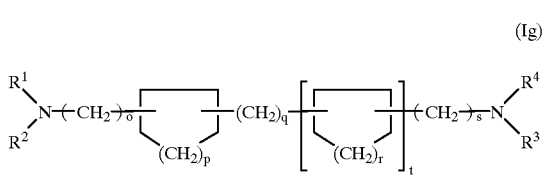
(Ig)

where o, q and s are each independently of the others 0 or an integer from 1 to 6, p and r are independently of each other 1 or 2, and t is 0, 1 or 2, the rings

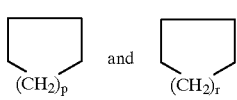

are unsubstituted or substituted by 1, 2 or 3 alkyl radicals, and $R^1$, $R^2$, $R^3$ and $R^4$ are each independently of the others hydroxyalkyl or H.

Particularly useful compounds of this type are

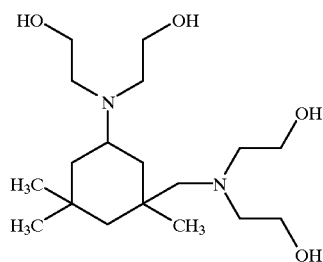

-continued

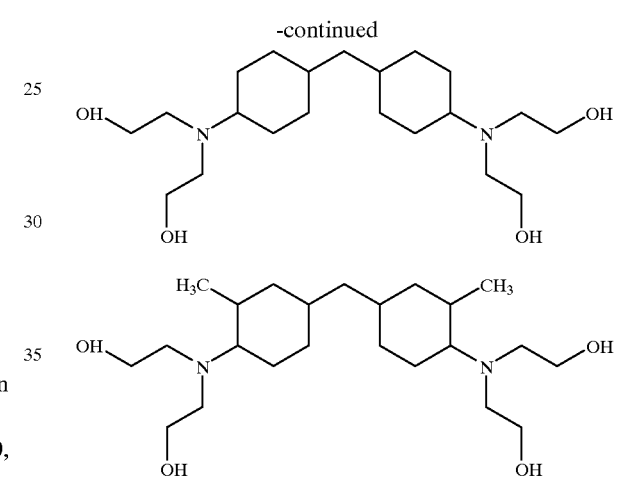

(7) A polyalkanolamine obtainable by self-condensation of dialkanolamines and/or trialkanolamines in the presence or absence of mono- or polyhydric alcohols or mono- or polyacid amines.

An example of such oligomeric or polymeric compounds is the triethanol condensation product which is represented in idealized form by the following schematic formula:

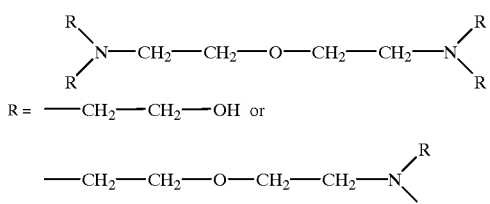

The compounds of the formulae Ia, Ib (except the aminals mentioned), Ic, Id, Ie, If and Ig can be obtained by reacting the corresponding polyamines with alkylene oxides.

The reaction of amines with alkylene oxides, especially ethylene oxide and propylene oxide, to form the corresponding alkanolamines is known in principle. For this, the amines are reacted with the alkylene oxides in the presence of a proton donor—water, in general—preferably at temperatures within the range from 30 to 120° C. and at atmospheric pressure or at superatmospheric pressure, preferably at from 1 to 5 bar, by using about one equivalent of the alkylene oxide per NH function to be alkoxylated. To achieve complete alkoxylation, it is possible to use a small excess of alkylene oxide, but it is preferable to use the stoichiometric amount or even a small deficiency of the alkylene oxide with respect to the NH functions. The alkoxylation can be carried out with one alkylene oxide or with a mixture of two or more alkylene oxides. Alternatively, the alkoxylation with two or more alkylene oxides can also be carried out in succession.

Possible catalysts besides water are alcohols and acids, but water is preferred (for the alkoxylation of amines cf. N. Schönfeld, Grenzflächenaktive Ethylenoxid-Addukte, p. 29–33, Wissenschaftliche Verlagsgesellschaft mbH, Stuttgart 1976 or S. P. McManus et al., Synth. Comm. 3, 177 (1973)).

The amount of water used as catalyst and/or solvent can vary in accordance with requirement and necessity. In the case of liquid, low viscosity amines, amounts of water within the range from 1 to 5% are sufficient to catalyze the reaction. Solid, high viscosity or polymeric amines are advantageously reacted in a state of solution or dispersion in the water; the amount of water can then be within the range from 10 to 90%.

Essentially only the NH groups will react under the above-described conditions for an alkoxylation in the presence of water. The resulting OH groups are generally not alkoxylated, so that essentially a monoalkoxylation of NH groups takes place (that is, at most 1 mol of alkylene oxide is added per mole of NH).

The average degree of alkoxylation of the active NH groups is preferably >75% in the case of compounds having fewer than 5 nitrogen atoms.

Examples of usable starting polyamines include α,ω-oligomethylenediamines, such as 1,2-ethylenediamine, 1,3-propanediamine, 1,6-hexamethylenediamine, 1,8-octamethylenediamine, 1,12-dodecamethylenediamine, 2,2-dimethyl-1,3-propanediamine, 1,2-propanediamine, 2-(ethylamino)ethylamine, 2-(methylamino)propylamine, N-(2-aminoethyl)-1,2-ethanediamine, N-(2-aminoethyl)-1,3-propanediamine, N-(2-aminoethyl)-N-methylpropanediamine, N,N-bis(3-aminopropyl)ethylenediamine, 4-aminoethyl-1,8-octanediamine, 2-butyl-2-ethyl-1,5-pentanediamine, 2,2,4-trimethylhexamethylenediamine, 2-methylpentamethylenediamine, 1,3-diaminopentane, 3-isopropylaminopropylamine, triethylenetetramine and tetraethylenepentamine.

Oligo- and poly(N-(β-hydroxyethyl)amino compound)s (aminals) can also be prepared by condensation of aliphatic dialdehydes and diethanolamine.

Poly-N-(β-hydroxyethyl)amino compounds (8) are obtained as described for example in U.S. Pat. No. 4,505,839 and DE-A-3 206 459 by thermal condensation of triethanolamine to poly(triethanolamine) or by thermal condensation of alkanolamines to hydroxyl-containing polyethers. The condensation of the alkanolamines can also be carried out as described in DE-A-1 243 874 in the presence of mono- or polyacid primary or secondary amines or mono- or polyhydric alcohols. Depending on condensation conditions, the molecular weight of these products and hence their viscosity can be varied within a wide range.

The weight average molecular weights of these polycondensates are customarily within the range from 200 to 100,000.

The compounds of the formulae Ie can be prepared by alkoxylation of dendrimer polyamines, whose synthesis by Michael addition of aliphatic diamines to acrylonitrile and subsequent catalytic hydrogenation is described in WO 93/14147. An example hereof is the hydrogenated adduct of 4 mol of acrylonitrile and ethylenediamine. This hexamine with 4 primary amino groups can be further reacted in a similar manner to form the N-14-amine with 8 primary amino groups. Instead of ethylenediamine it is also possible to use other aliphatic di- and polyamines.

Similarly, amino-containing polymers, such as polyethyleneimine, can be reacted with ethylene oxide in an aqueous solution to form useful poly-N-(β-hydroxyethyl) amino compounds of the formula Ic by converting the NH functions present to >40% in general, especially >60%, preferably >80%. The preparation of polyethyleneimine is common knowledge. Polyethyleneimines within the molecular weight range $M_w$ of from 800 to 2,000,000 are obtainable for example from BASF under the designation of Lupasol®. Polyethyleneimines generally consist of branched polymer chains and hence contain primary, secondary and tertiary amino groups. Their ratio is customarily about 1:2:1. However, at very low molecular weights higher proportions of primary amino groups are possible. Substantially linear polyethyleneimines, which are obtainable via specific methods of synthesis, are also suitable for this application.

Polymeric alkyleneimines with primary and/or secondary amino groups useable in the compositions of this invention after alkoxylation are described in Encyclopedia of Polymer Science and Engineering, M. Mark (Editor), Revised Edition, Volume 1, p. 680–739, John Wiley & Sons Inc., New York, 1985.

It is also possible to prepare hydroxyalkyl-substituted polyalkyleneimines by polymerization of N-hydroxyalkylaziridines.

Furthermore, alkoxylated allylamine polymers and copolymers can also be used in the compositions of this invention.

The compounds of the formula If can be prepared starting from oxamines, such as 4,7-dioxadecane-1,10-diamine, 4,9-dioxadecane-1,12-diamine, 4,11-dioxatetradecane-1,14-diamine, 4,9-dioxadodecane-1,12-diamine or 4,7,10-trioxatridecane-1,13-diamine. Suitable starting amines also include polyoxyalkyleneamines marketed by Huntsman under the name of Jeffamine®. Examples hereof are the diamines Jeffamine D-230, Jeffamine D-400, Jeffamine D-2000, Jeffamine D-4000, Jeffamine ED-600, Jeffamine ED-900, Jeffamine ED-2001, Jeffamine EDR-148 and also the triamines Jeffamine T-403, Jeffamine T-3000 and Jeffamine T-5000.

Reaction products of aromatic polyamines with alkylene oxide are in principle also suitable for use in the compositions of this invention.

The compositions of this invention further comprise an addition polymer (2) containing from 5 to 100% by weight, preferably from 20 to 100% by weight, in particular from 50 to 100% by weight, of units derived from at least one ethylenically unsaturated mono- or dicarboxylic acid. The polymer can also be partially or wholly present in the form of a salt; the acidic form is preferred. They are essentially free of carboxylic anhydride structures.

The weight average molecular weight of component (2) is greater than 500 and generally less than 5 million. The K values of the polymers (by the method of H. Finkentscher, Cellulose-Chemie 13 (1932), 58–64, 71 and 74), which are a measure of the molecular weight, are generally within the range from 15 to 150 (measured in 1% strength by weight solution). The polymer shall on average contain at least 4 carboxylic acid groups or salt groups derived therefrom per polymer chain.

Useful ethylenically unsaturated carboxylic acids include in particular $C_3$–$C_6$-carboxylic acids such as acrylic acid, methacrylic acid, crotonic acid, fumaric acid, maleic acid, 2-methylmaleic acid and itaconic acid and also monoesters of ethylenically unsaturated dicarboxylic acids, for example monoalkyl maleates of $C_1$–$C_8$-alcohols.

The polymers can also be obtained starting from ethylenically unsaturated mono- or dicarboxylic acids, alone or mixed with the carboxylic acids mentioned. The anhydride functions are converted into carboxylic acid groups under the polymerization conditions, for example in the course of a solution or emulsion polymerization in an aqueous medium, or following the polymerization by reaction with an acid or base. Useful ethylenically unsaturated carboxylic anhydrides include in particular maleic anhydride, itaconic anhydride, acrylic anhydride and methacrylic anhydride.

As well as the hereinbefore mentioned monomers (monomers b), the polymer can additionally contain from 0 to 95% by weight, preferably from 0 to 80% by weight, in particular from 0 to 50% by weight, of units derived from at least one further monomer. Useful further monomers are:

Aromatic vinyl compounds such as styrene, α-methylstyrene and vinyltoluenes (monomers $b_1$).

Linear 1-olefins, branched-chain 1-olefins or cyclic olefins (monomers $b_2$), for example ethene, propene, butene, isobutene, pentene, cyclopentene, hexene, cyclohexene, octene, 2,4,4-trimethyl-1-pentene, alone or mixed with 2,4,4-trimethyl-2-pentene, $C_8$–$C_{10}$-olefin, 1-dodecene, $C_{12}$–$C_{14}$-olefin, octadecene, 1-eicosene ($C_{20}$), $C_{20}$–$C_{24}$-olefin; metallocene-catalytically prepared oligoolefins having a terminal double bond, for example oligopropene, oligohexene and oligooctadecene; cationically polymerized olefins having a high α-olefin content, for example polyisobutene. Preferably, however, the polymer contains no units derived from ethene or linear 1-olefin.

Butadiene

Vinyl and allyl alkyl ethers having from 1 to 40 carbon atoms in the alkyl radical, which alkyl radical can be further substituted by substituents such as a hydroxyl group, an amino or dialkylamino group or one or more alkoxylate groups (monomers $b_3$), e.g. methyl vinyl ether, ethyl vinyl ether, propyl vinyl ether, isobutyl vinyl ether, 2-ethylhexyl vinyl ether, vinyl cyclohexyl ether, vinyl 4-hydroxybutyl ether, decyl vinyl ether, dodecyl vinyl ether, octadecyl vinyl ether, 2-(diethylamino)ethyl vinyl ether, 2-(di-n-butylamino)ethyl vinyl ether, methyldiglycol vinyl ether and also the corresponding allyl ethers and mixtures thereof.

Acrylamides and alkyl-substituted acrylamides (monomers $b_4$), e.g. acrylamide, methacrylamide, N-tert-butylacrylamide, N-methyl(meth)acrylamide.

Sulfo-containing monomers (monomers $b_5$), e.g. allylsulfonic acid, methallylsulfonic acid, styrenesulfonate, vinylsulfonic acid, allyloxybenzenesulfonic acid, 2-acrylamido-2-methylpropanesulfonic acid, their corresponding alkali metal or ammonium salts and mixtures thereof.

$C_1$–$C_8$-alkyl esters or $C_1$–$C_4$-hydroxyalkyl esters of acrylic acid, methacrylic acid or maleic acid, or acrylic, methacrylic or maleic esters of $C_1$–$C_{18}$-alcohols alkoxylated with from 2 to 50 mol of ethylene oxide, propylene oxide, butylene oxide or mixtures thereof (monomers $b_6$), e.g. methyl (meth)acrylate, ethyl (meth)acrylate, propyl (meth)acrylate, isopropyl (meth)acrylate, butyl (meth)acrylate, hexyl (meth)acrylate, 2-ethylhexyl (meth)acrylate, hydroxyethyl (meth)acrylate, hydroxypropyl (meth)acrylate, 1,4-butanediol monoacrylate, dibutyl maleate, ethyldiglycol acrylate, methylpolyglycol acrylate (11 EO), (meth)acrylic esters of $C_{13}$/$C_{15}$ oxo alcohol reacted with 3, 5, 7, 10 or 30 mol of ethylene oxide, and mixtures thereof.

Alkylaminoalkyl (meth)acrylates or alkylaminoalkyl (meth)acrylamides or quaternization products thereof (monomers $b_7$), e.g. 2-(N,N-dimethylamino)ethyl (meth)acrylate, 3-(N,N-dimethylamino)propyl (meth)acrylate, 2-(N,N,N-trimethylammonio)ethyl (meth)acrylate chloride, 2-dimethylaminoethyl(meth)acrylamide, 3-dimethylaminopropyl(meth)acrylamide, 3-trimethylammoniopropyl(meth)acrylamide chloride.

Vinyl and allyl esters of $C_1$–$C_{30}$-monocarboxylic acids (monomers $b_8$), e.g. vinyl formate, vinyl acetate, vinyl propionate, vinyl butyrate, vinyl valerate, vinyl 2-ethylhexanoate, vinyl nonanoate, vinyl decanoate, vinyl pivalate, vinyl palmitate, vinyl stearate, vinyl laurate.

Examples of further monomers $b_9$ are:

N-vinylformamide, N-vinyl-N-methylformamide, styrene, α-methylstyrene, 3-methylstyrene, butadiene, N-vinylpyrrolidone, N-vinylimidazole, 1-vinyl-2-methylimidazole, 1-vinyl-2-methylimidazoline, N-vinylcaprolactam, acrylonitrile, methacrylonitrile, allyl alcohol, 2-vinylpyridine, 4-vinylpyridine, diallyldimethylammonium chloride, vinylidene chloride, vinyl chloride, acrolein, methacrolein and vinylcarbazole and mixtures thereof.

Preferred further monomers are the aforementioned esters of acrylic acid and methacrylic acid, the aromatic vinyl compounds, butadiene, vinyl esters, (meth)acrylonitrile and the aforementioned (meth)acrylamides.

Particularly preferred comonomers are methyl acrylate, ethyl acrylate, butyl acrylate, 2-ethylhexyl acrylate, methyl methacrylate, butyl methacrylate, hydroxyethyl acrylate, hydroxypropyl acrylate, hydroxybutyl acrylate, hydroxyethyl methacrylate, styrene, butadiene, vinyl acetate, acrylonitrile, methacrylonitrile, acrylamide, methacrylamide and/or N-butylacrylamide.

The polymers can be prepared according to customary polymerization processes, for example by free-radical bulk, emulsion, suspension, dispersion, precipitation or solution polymerization. The polymerization processes mentioned are preferably carried out in the absence of oxygen, preferably in a stream of nitrogen. All of the polymerization methods are carried out using customary apparatus, for example stirred tanks, stirred-tank cascades, autoclaves, tubular reactors and kneaders. Preference is given to using the method of solution, emulsion, precipitation or suspension polymerization. The methods of solution polymerization and emulsion polymerization in an aqueous medium are particularly preferred.

An aqueous free-radical solution polymerization gives water-soluble polymers and copolymers, preferably starting from 50–100% by weight of the aforementioned carboxylic acids, carboxylic anhydrides, monoesters or a mixture of two or more thereof. Their weight average molecular weight is generally within the range from 500 to 1,000,000, preferably 2000 to 200,000. The K values of the addition polymers are generally within the range from 10 to 150, preferably 15 to 100 (measured in 1% strength by weight solution in water). The solids content is generally within the range from 10 to 80% by weight, preferably 20 to 65% by weight. The polymerization can be carried out at temperatures from 20 to 300° C., preferably from 60 to 200° C. The solution polymerization is carried out in a conventional manner, for example as described in EP-A-75 820 or DE-A-36 20 149.

An aqueous emulsion polymerization gives polymers having a weight average molecular weight of from 1000 to 2,000,000, preferably 5000 to 500,000. The K values are generally within the range from 15 to 150 (1% strength by weight in dimethylformamide). The weight average particle size (determined by means of ultracentrifuge) is preferably within the range from 50 to 1000 nm. The dispersion can have a monomodal or polymodal particle size distribution. The emulsion polymerization can be carried out so that the solids volume content is within the range from 20 to 70%, preferably 30 to 60%.

The emulsion polymerization with the aforementioned carboxyl-containing monomers is carried out in a conventional manner, for example as described in DE-A-31 34 222 or U.S. Pat. 5,100,582. The carboxylic acid monomers preferably account for a proportion of from 5 to 50%.

The polymerization is preferably carried out in the presence of free-radical initiator compounds. These compounds are preferably used in an amount of from 0.05 to 15, particularly preferably in a proportion of from 0.2 to 8, % by weight, based on the monomers used in the polymerization.

Suitable polymerization initiators include for example peroxides, hydroperoxides, peroxodisulfates, percarbonates, peroxyesters, hydrogen peroxide and azo compounds. Examples of initiators, which can be water-soluble or else water-insoluble, are hydrogen peroxide, dibenzoyl peroxide, dicyclohexyl peroxydicarbonate, di-lauroyl peroxide, methyl ethyl ketone peroxide, di-tert-butyl peroxide, acetylacetone peroxide, tert-butyl hydroperoxide, cumene hydroperoxide, tert-butyl perneodecanoate, tert-amyl perpivalate, tert-butyl perpivalate, tert-butyl perneohexanoate, tert-butyl per-2-ethylhexanoate, tert-butyl perbenzoate, lithium peroxodisulfate, sodium peroxodisulfate, potassium peroxodisulfate, ammonium peroxodisulfate, azobisisobutyronitrile, 2,2'-azobis(2-amidinopropane)dihydrochloride, 2-(carbamoylazo) isobutyronitrile and 4,4-azobis(4-cyanovaleric acid). The known redox initiator systems can also be used as polymerization initiators.

The initiators can be used alone or mixed with each or one another, for example mixtures of hydrogen peroxide and sodium peroxodisulfate. A polymerization in an aqueous medium is preferably carried out using water-soluble initiators.

To produce polymers having a low average molecular weight, it is frequently advantageous to carry out the copolymerization in the presence of regulators. Customary regulators can be used for this, for example organic SH-containing compounds, such as 2-mercaptoethanol, 2-mercaptopropanol, mercaptoacetic acid, tert-butyl mercaptan, n-octyl mercaptan, n-dodecyl mercaptan and tert-dodecyl mercaptan, $C_1$–$C_4$-aldehydes, such as formaldehyde, acetaldehyde, propionaldehyde, hydroxylammonium salts such as hydroxylammonium sulfate, formic acid, sodium bisulfite or isopropanol. The polymerization regulators are generally used in amounts from 0.1 to 10% by weight, based on the monomers.

To produce higher molecular weight copolymers, it is frequently advantageous to polymerize in the presence of crosslinkers. Such crosslinkers are compounds having two or more ethylenically unsaturated groups, for example diacrylates or dimethacrylates of at least dihydric saturated alcohols, for example ethylene glycol diacrylate, ethylene glycol dimethacrylate, 1,2-propylene glycol diacrylate, 1,2-propylene glycol dimethacrylate, 1,4-butanediol diacrylate, 1,4-butanediol dimethacrylate, hexanediol diacrylate, hexanediol dimethacrylate, neopentylglycol diacrylate, neopentylglycol dimethacrylate, 3-methylpentanediol diacrylate and 3-methylpentanediol dimethacrylate. Similarly, the acrylic and methacrylic esters of alcohols having more than 2 OH groups can be used as crosslinkers, for example trimethylolpropane triacrylate or trimethylolpropane trimethacrylate. A further class of crosslinkers are diacrylates or dimethacrylates of polyethylene glycols or polypropylene glycols having molecular weights from 200 to 9000 in each case. Divinylbenzene is suitable as well.

The crosslinkers are preferably used in amounts from 10 ppm to 5% by weight, based on the monomers to be polymerized.

In an emulsion, precipitation, suspension or dispersion polymerization, it can be advantageous to stabilize the polymer particles or droplets by means of surface-active assistants.

Emulsifiers or protective colloids are typically used for this purpose. Anionic, nonionic, cationic and amphoteric emulsifiers can be used. Preference is given to anionic emulsifiers, for example alkylbenzenesulfonic acids, sulfonated fatty acids, sulfosuccinates, fatty alcohol sulfates, alkylphenol sulfates and fatty alcohol ether sulfates. Suitable nonionic emulsifiers include for example alkylphenol ethoxylates, primary alcohol ethoxylates, fatty acid ethoxylates, alkanolamide ethoxylates, fatty amine ethoxylates, EO/PO block copolymers and alkylpolyglucosides.

Typical protective colloids include for example cellulose derivatives, polyethylene glycol, polypropylene glycol, copolymers of ethylene glycol and propylene glycol, polyvinyl acetate, polyvinyl alcohol, polyvinyl ether, starch and starch derivatives, dextran, polyvinylpyrrolidone, polyvinylpyridine, polyethyleneimine, polyvinylimidazole, polyvinylsuccinimide, polyvinyl-2-methylsuccinimide, polyvinyl-1,3-oxazolid-2-one, polyvinyl-2-methylimidazoline and maleic acid or maleic anhydride copolymers as described for example in DE 2 501 123.

The emulsifiers or protective colloids are customarily used in concentrations from 0.05 to 20% by weight, based on the monomers.

In a polymerization in aqueous emulsion, solution or dilution, the monomers can be wholly or partly neutralized with customary, inorganic or organic bases before or during the polymerization.

The ethylenically unsaturated carboxylic acids are particularly preferably not neutralized before or during the polymerization. Preferably, no neutralizing agent apart from alkanolamine (B) is added after the polymerization, either.

If the polymer is prepared by the method of a solution, precipitation or suspension polymerization in a solvent or solvent mixture which is volatile in steam, the solvent can be removed by introduction of steam in order to obtain an aqueous solution or dispersion in this way. The polymer can also be separated from the organic diluent by drying.

The polymers (B) are preferably present in the form of an aqueous dispersion or solution having solids contents of preferably from 10 to 80% by weight, particularly preferably 25 to 65% by weight.

The polymer (2) can also be obtained by grafting maleic acid or anhydride, or a monomer mixture comprising maleic acid or maleic anhydride, onto a grafting base. Suitable grafting bases include for example monosaccharides, oligosaccharides, modified polysaccharides and alkylpolyglycol ethers. Such graft polymers are described for example in DE-A-4 003 172 and EP-A-116 930.

To prepare the formaldehyde-free compositions of this invention, alkanolamine (1) and polymer (2) are preferably used in such a relative ratio that the molar ratio of carboxyl groups of component (2) to hydroxyl groups of component (1) is within the range from 20:1 to 1:5, preferably within the range from 8:1 to 1:2, particular preferably within the range from 4:1 to 1:1.

The aqueous formaldehyde-free binders of this invention are prepared for example by adding alkanolamine (1) to the aqueous dispersion or solution of polymer (2). In some cases it is advantageous to add the aqueous solution or dispersion of polymer (2) to alkanolamine (1). Alkanolamine (1) can be used either undiluted or as an aqueous solution whose concentration is preferably >25%.

The addition can take place at room temperature or else at an elevated temperature, for example at 90° C.

The viscosity of the novel aqueous compositions (1) and (2) is generally within the range from 10 to 100,000 mPa.s, measured in a rotary viscometer in accordance with DIN 53019 at 23° C. and a shear rate of 250 sec$^{-1}$, for an active content of 40% by weight.

Preference is given to viscosities from 20 to 20,000 mpa.s, particularly preferably from 50 to 5000 mpa.s.

If component (2) is an emulsion polymer, compositions with a lower viscosity can be prepared than with homogeneously dissolved, acid-containing polymers for a comparable molecular weight or K value.

The compositions of this invention may include a reaction accelerant, but preferably they are present without such a reaction accelerant. Suitable reaction accelerants include for example alkali metal hypophosphites, phosphites, polyphosphates, dihydrogen phosphates, polyphosphoric acid, hypophosphoric acid, phosphoric acid, alkylphosphinic acid or oligomers or polymers of these salts and acids.

Further suitable catalysts include strong acids such as sulfuric acid, p-toluenesulfonic acid. Similarly, polymeric sulfonic acids, for example poly(acrylamido-2-methylpropanesulfonic acid), poly(vinylsulfonic acid), poly (p-styrenesulfonic acid), poly(sulfopropyl methacrylate), and polymeric phosphonic acids such as poly (vinylphosphonic acid) and copolymers derived therefrom with the above-described comonomers are suitable.

It is also possible to incorporate the accelerating sulfonic acid or phosphonic acid into the acid-containing polymer (2) by using the corresponding monomers such as, for example, acrylamido-2-methylpropanesulfonic acid, vinylsulfonic acid, p-styrenesulfonic acid, sulfopropyl methacrylate or vinylphosphonic acid as comonomer in the preparation of the polymeric carboxylic acids.

Also suitable as catalysts are organotitanates and organozirconates, for example triethanol titanate, titanium chelate ETAM and tetrabutyl zirconate, which are marketed for example by Hüls.

Furthermore, the compositions of this invention may include at least one di- or trialkanolamine. In general, from 0.5 to 200% by weight, based on the amount of component (1), are used. Preference is given to using di- or triethanolamine.

Furthermore, the compositions of this invention may include customary additives depending on the intended application. For example, they may include bactericides or fungicides. In addition, they may include a hydrophobicizing agent for enhancing the water resistance of the treated substrates. Suitable hydrophobicizing agents are customary aqueous paraffin dispersions or silicones. The compositions may further include wetting agents, thickeners, plasticizers, retention agents, pigments and fillers.

Finally, the compositions of this invention may include customary fire retardants, for example aluminum silicates, aluminum hydroxides, borates and/or phosphates.

The compositions frequently also include coupling reagents, such as alkoxysilanes, for example 3-aminopropyltriethoxysilane, soluble or emulsifiable oils as lubricants and dustproofing agents and also wetting aids.

The compositions of this invention can also be used in a blend with binders, for example urea-formaldehyde resins, melamine-formaldehyde resins or phenol-formaldehyde resins.

The compositions of this invention are formaldehyde-free. Formaldehyde-free means that the compositions of this invention do not comprise any significant amounts of formaldehyde and do not release any significant amounts of formaldehyde during drying and/or curing. In general, the compositions comprise <100 ppm of formaldehyde. They make it possible to produce shaped articles with a short curing time and confer excellent mechanical properties on the shaped articles.

The formaldehyde-free thermally curable compositions of this invention are essentially uncrosslinked and hence thermoplastic in use. If necessary, however, they can be pre-crosslinked to a small extent.

On heating, the water present in the opposition evaporates, and the composition undergoes curing. These processes can take place in succession of simultaneously. Curing in the present context is to be understood as meaning the chemical alteration of the composition, for example crosslinking through formation to covalent bonds between the various constituents of the composition, formation of ionic interactions and clusters, formation of hydrogen bonds. Furthermore, the curing can be accompanied by physical changes in the binder, for example phase transitions or phase inversion.

As a consequence of curing, the solubility of the composition decreases; for example, water-soluble compositions are converted into partly to substantially water-insoluble materials.

The degree of curing can be characterized by extraction tests on the cured compositions in suitable solvents, for example water or acetone. The higher the degree of curing, the greater the proportion of cured material which remains insoluble, i.e. the greater its gel content.

The curing temperatures are within the range from 75 to 250° C., preferably within the range from 90 to 200° C. The duration and temperature of the heating influence the degree of curing. An advantage of the compositions of this invention is that their curing can take place at comparatively low temperatures. For instance, distinct crosslinking takes place at as low a temperature as 100–130° C.

The curing can also take place in two or more stages. For instance, a first step can be carried out with a curing temperature and time such that only a low degree of curing is achieved, while substantially complete curing takes place in a second step. This second step can take place spatially and chronologically separated from the first step. This makes it possible, for example, to use the compositions of this invention for producing binder-impregnated semifabricates which can be molded and cured elsewhere.

The compositions are used in particular as binders for producing shaped articles from fibers or chips. The chips or fibers can be chips or fibers composed of renewable raw materials or synthetic or natural fibers, for example from postuse clothing. Suitable renewable raw materials include in particular sisal, jute, flax, coir fibers, banana fibers, hemp and cork. Particular preference is given to wood fibers or wood chips.

The shaped articles preferably have a density of from 0.4 to 1.0 g/cm$^3$ at 23° C.

Contemplated shaped articles include boards. The boards are generally at least 1 mm, preferably at least 2 mm, in thickness. Also contemplated are automotive interior parts, for example door inner linings, dashboard members and parcel shelves.

The weight of binder used is generally from 0.5 to 40% by weight, preferably from 1 to 30% by weight (binder solids, calculated as sum of 1+2), based on the substrate (fibers or chips).

The fibers or chips can be directly coated with the binder or mixed with the aqueous binder. The viscosity of the aqueous binder is preferably (especially for the production of shaped articles from wood fibers of wood chips) set to within the range from 10 to 10,000, particularly preferably from 50 to 5000, very particularly preferably from 100 to 2500, mPa.s (DIN 53019, rotary viscometer at 250 sec$^{-1}$.

The mixture of fibers or chips and the binder can be predried for example at from 10 to 150° C. and then be pressed for example at temperatures from 50 to 250°, preferably from 100 to 240° C., particularly preferably from 120 to 225° C., and pressures from generally 2 to 1000 bar, preferably from 10 to 750 bar, particularly preferably from 50 to 500 bar, to form shaped articles.

The binders are particularly suitable for producing wood-base materials such as wood chipboard and wood fiberboard (cf. Ullmann's Encyclopädie der technischen Chemie, 4th Edition 1976, Volume 12, p. 709–727), which can be produced by bonding subdivided wood for example wood chips and wood fibers. The water resistance of wood base materials can be increased by adding a commercially available aqueous paraffin dispersion or other hydrophobicizing agent to the binder or beforehand or subsequently to the fibers or chips.

The manufacture of chipboard is common knowledge and described for example in H. J. Deppe, K. Ernst Taschenbuch der Spanplattentechnik, 2nd Edition, Verlag Leinfelden 1982.

Preference is given to using chips whose size is on average within the range from 0.1 to 4 mm, in particular from 0.2 to 2 mm, and which have a water content of less than 6% by weight. However, it is also possible to use distinctly coarser chips and chips having a higher moisture content. The binder which is applied as uniformly as possible to the wood chips using a weight ratio of binder:wood chip, based on the active ingredients (calculated as 1)+2)), which is preferably within the range from 0.02:1 to 0.3:1. Uniform distribution can be obtained for example by spraying a finely divided form of the binder onto the chips.

The resinated wood chips are then sprinkled out to form a layer with a very uniform surface, the thickness of the layer depending on the thickness desired for the ready-produced chipboard. The sprinkled layer is pressed at a temperature of for example from 100 to 250° C., preferably from 120 to 225° C. and pressures of customarily from 10 to 750 bar to form a board. The pressing times required can vary between wide limits and are generally within the range from 15 seconds to 30 minutes.

The wood fibers of suitable quality required for manufacturing medium density fiberboard (MDF) from the binders can be produced by grinding bark-free wood chips in special mills or refiners at about 180° C.

To apply binder to them, the wood fibers are generally suspended in an air stream and the binder blown into the resulting fiber stream ("blow-line" process). The ratio of wood fiber to binder based on the dry content and solids content, respectively, is customarily within the range from 40:1 to 2:1, preferably within the range from 20:1 to 4:1. The resinated fibers are dried in the fiber stream at from 130 to 180° C., for example, sprinkled out to form a fiber web and compressed at pressures from 20 to 40 bar to form boards or shaped articles.

The resinated wood fibers can also, as described for example in DE-A-2 417 243, be processed to form a transportable fiber mate This semifabricate can then be further processed in a second, spatially and chronologically separate step, to form boards or moldings, for example door inner linings of automotive vehicles.

Other natural fiber materials such as sisal, jute, hemp, flax, coir fibers, banana fibers and other natural fibers can be processed into boards and shaped articles using the binders. The natural fiber materials can also be used in mixtures with synthetic fibers, for example polypropylene, polyethylene, polyester, polyamides or polyacrylonitrile. In effect, these synthetic fibers can also act as cobinders alongside the binder of this invention. The proportion of synthetic fiber in this instance is preferably less than 50% by weight, in particular less than 30% by weight, very particularly preferably less th an 10% by weight, based on all chips or fibers. The fibers can be processed by the wood fiberboard methods. However, it is also possible for preformed natural fiber mats to be impregnated with the binders of this invention with or without the addition of a wetting aid. The impregnated mats are then pressed in the binder-moist or predried state, for example at temperatures within the range from 100 to 250° C. and pressures within the range from 10 to 100 bar, to form boards or moldings.

The shaped articles obtained according to this invention have low water absorption, low thickness swelling after water aging and high strength and are formaldehyde-free.

In addition, the compositions of this invention can be used as binders for coating and impregnating materials for boards composed of organic and/or inorganic fibers, nonfibrous mineral fillers and also starch and/or aqueous polymer dispersions. The coating an impregnating materials confer a high bending modulus on the boards. The manufacture of such boards is known.

Such boards are customarily used as acoustic insulating boards. The thickness of the boards is customarily within the range from about 5 to 30 mm, preferably within the range from 10 to 25 mm. The edge length of the square or rectangular boards is customarily within the range from 200 to 2000 mm.

Furthermore, the compositions of the invention can comprise assistants customary in coating and impregnating technology. Examples hereof are finely divided inert fillers, such as aluminum silicates, quartz, precipitated or pyrogenic silica, light and heavy spar, talc, dolomite or calcium carbonate; coloring pigments, such as titanium white, zinc white, iron oxide black, etc., foam inhibitors, such as modified dimethylpolysiloxanes, and adhesion promoters and also preservatives.

Components (1) and (2) are generally present in the coating material in an amount of from 1 to 65% by weight. The proportion of inert fillers is generally from 0 to 85% by weight, and the water content is at least 10% by weight.

The preparation of the compositions of this invention is effected in a simple manner by stirring any additives into the composition.

The compositions are used in a conventional manner by application to a substrate, for example by spraying, rolling, casting or impregnating. The amounts applied vary in general from 2 to 100 g/m$^2$, based on the sum of components (1) and (2) present in the composition.

The amounts of additives to be used are known to those skilled in the art and depend in the particular case on the desired properties and the intended purpose.

The compositions of this invention are also suitable for use as binders for insulants composed of inorganic fibers, such as mineral fibers and glass fibers. Such insulants are industrially produced by spinning melts of the corresponding mineral raw materials, see U.S. Pat. No. 2,550,465, U.S. Pat. No. 2,604,427, U.S. Pat. No. 2,830,648, EP-A-354 913 and EP-A-567 480. The composition is then sprayed onto the freshly prepared inorganic fibers while they are still hot. The water then largely evaporates, leaving the composition adhering to the fibers as a viscous material in an essentially uncured state. A continuous, binder-including fiber mat produced in this way is transported on suitable conveyor belts through a curing oven. There the mat cures at temperatures within the range from about 100 to 200° C. to form a stiff matrix. After curing, the insulant mats are end-itemed in a suitable manner.

The predominant proportion of the mineral or glass fibers used in the insulants has a diameter within the range from 0.5 to 20 μm and a length within the range from 0.5 to 10 cm.

The compositions of this invention are also suitable for use as binders for fiber webs.

Suitable fiber webs include for example webs composed of cellulose, cellulose acetate, esters and ethers of cellulose, cotton, hemp, animal fibers, such as wool or hairs, in particular webs of synthetic or inorganic fibers, for example aramid, carbon, polyacrylonitrile, polyester, mineral, PVC or glass fibers.

If used as binders for fiber webs, the compositions of this invention may include for example the following additives: silicates, silicones, boron-containing compounds, lubricants, wetting agents.

Preference is given to glass fiber webs. The unbonded fiber webs, glass fiber webs in particular, are bonded, i.e. consolidated, by the binder of this invention.

To this end, the binder of this invention is applied to the unbonded fiber web, for example by coating, impregnating or saturating, preferably in a weight ratio of fiber/polymer (solids) of from 10:1 to 1:1, particularly preferably of from 6:1 to 3:1.

For this the binder is preferably used in the form of a dilute aqueous preparation having a water content of from 95 to 40% by weight.

After application of the binder to the unbonded fiber web, the web is generally dried, preferably at from 100 to 400° C., in particular from 130 to 280° C., very particularly preferably at from 130 to 230° C., for a period of from preferably 10 seconds to 10 minutes, in particular for a period of from 10 seconds to 3 minutes.

The resulting bonded fiber web has high strength in the dry and wet state. The binders of this invention allow in particular short drying times and also low drying temperatures.

The bonded fiber webs, especially glass fiber webs, are useful as or in roofing membranes, as base materials for wallpapers or as inliners or base materials for floor coverings, for example floor coverings composed of PVC.

When used as roofing membranes, the bonded fiber webs are generally coated with bitumen.

The aqueous compositions of this invention can also be used to produce foamed boards or shapes. To this end, the water present in the composition is initially removed at temperatures <100° C. down to a level of <20% by weight. The resulting viscous composition is then foamed at temperatures >100° C., preferably at from 120 to 300° C. The residual water still present in the mixture and/or the gaseous breakdown products formed in the course of the curing reaction act as blowing agents in effect. The resulting crosslinked polymer foams can be used for example for thermal and acoustic insulation.

The compositions of this invention can be used for impregnating paper, which is subsequently dried under gentle conditions, to produce laminates, for example for decorative applications, according to known processes. These laminates are heat and pressure laminated in a second step onto the substrate to be coated under such conditions that the binder will cure.

The compositions of this invention are also suitable for use as formaldehyde-free core sand binders for producing casting molds and cores for metal casting according to conventional processes. They are also suitable for use as binders for the manufacture of abrasive papers and abrasives by processes as customarily practiced with phenolic resins.

The Examples which follow illustrate the invention. The K values were determined in 1% strength by weight solution (water or dimethylformamide).

EXAMPLES

Example A

Preparation of alkoxylated polyamines by reaction of polyamines with alkylene oxides:

2390 g of a 55% strength aqueous solution of a polyethyleneimine (average molecular weight, determined by light scattering, $M_w$=800, ratio of primary to secondary to tertiary nitrogen groups 4.4:3.8:1.8) are initially introduced into a 5 l stainless steel autoclave. The reactor is sealed and purged with nitrogen. The contents are heated to 90° C. with stirring and admixed at 90° C. with 1408 g (30 mol) of ethylene oxide in the course of from 5 to 6 hours at a maximum pressure of 5 bar. On completion of the addition and attainment of constant pressure, the temperature is maintained at 90° C. for a further two hours. The reactor is then cooled down to 40° C. and decompressed. The reaction mixture is additionally devolatilized at 40° C. under a pressure of 50 mbar for one hour to leave 3650 g of a clear, almost colorless solution having an alkoxylated polyethyleneimine content of about 75%.

The viscosity of the solutions is determined in accordance with DIN 53019 at 23° C. and a shear rate of 250 $\sec^{-1}$ using a Contraves Rheomat 115.

Solutions A2 to A5 are prepared in a similar manner:

| Solution | Polyamine | Mol of alkylene oxide per mol of NH group | Water content of solution (%) | pH | Viscosity at 250 sec-1 (mPa · s) |
|---|---|---|---|---|---|
| A1 | Polyethyleneimine Mw = 800 | 1.05 mol of EO | 25 | 13.7 | 3100 |
| A2 | Ethylenediamine | 1.0 mol of EO | 18 | 12.9 | 560 |
| A3 | Ethylenediamine | 1.0 mol of PO | 25 | 10.2 | 280 |
| A4 | Hexamethylenediamine | 1.05 mol of EO | 24 | 13.6 | 340 |
| A5 | Diethylenetriamine | 0.92 mol of EO | 23 | 13.5 | 580 |

EO = ethylene oxide
PO = propylene oxide

EO=ethylene oxide
PO=propylene oxide

Example B

To 400 g of 50% strength aqueous solution of a copolymer containing 55% by weight of acrylic acid units and 45% of maleic acid units (K value of a 1% strength aqueous solution=11; pH : 1.6; viscosity 140 mPas) are added at room temperature 79 g of the 76% strength aqueous solution A 4 over 10 min with stirring. This is followed at room temperature by the addition of 46 g of 25% strength aqueous ammonia solution over 5 min with stirring.

Active ingredients: 51.7% (active ingredients are all the constituents of the composition other than water)

viscosity: 280 mPas pH: 4.1

Example C

To 500 g of 50% strength aqueous solution of the copolymer of Example B are added at 80° C. 33.3 g of the solution of the ethoxylated polyethyleneimine A1 with stirring.

Active ingredients: 51.6% viscosity: 580 mPas pH: 1.9

Example D

Preparation of polymer dispersion D1:

A mixture consisting of

| | |
|---|---|
| 220 g | of water |
| 0.5 g | of a commercially available 28% strength by weight aqueous solution of the sodium salt of a mixture of sulfuric monoesters of ethoxylated C12/C14 fatty alcohols (average degree of ethoxylation = 2.8) = emulsifier solution i |
| 20 g | of addition stream 1 | was heated to 85° C. and, while the temperature of 85° C. was maintained, continuously admixed over 2 h, starting at the same time, with the remainder of addition stream 1 and at the same time with addition stream 2. The batch was subsequently stirred at 85° C. for 1 h.

Addition stream 1:
  3 g of sodium peroxodisulfate
  100 g of water
Addition stream 2:
  210 g of methyl methacrylate
  90 g of methacrylic acid
  15.6 g of emulsifier solution i
  391 g of water The K value of the resulting emulsion polymer (1% strength dimethylformamide solution) was 63.

Preparation of Composition

To 450 g of the aqueous polymer dispersion diluted to a solids content of 10% are added with stirring at room temperature 23 g of the 82% strength solution A2 and 0.8 g of the titanium chelate ETAM (from Hüls).

Active ingredients: 13.6%

Viscosity: 920 mPas pH: 6.4

Example E

To 450 g of a 25% strength solution of a copolymer containing 70% by weight of methacrylic acid units and 30% by weight of acrylic acid units (K value: 17; pH 1.1, viscosity 190 mpas) are added at room temperature 36.5 g of the 77% strength solution of the ethoxylated diethylenetriamine A5 and 5.6 g of a 50% strength aqueous sodium hypophosphite solution.

Active ingredients: 29.1%

Viscosity: 240 mPas pH: 3.8

Example F

To 425 g of a 40% strength aqueous solution of a copolymer of 85% by weight of acrylic acid and 15% by weight of ethyl acrylate, synthesized according to Example 9 of DE-A-36 20 149, were added at room temperature with stirring 88.5 g of the 77% strength solution of the ethoxylated diethylenetriamine A5.

Active ingredients: 46.5%

Viscosity: 4800 mPas pH: 4.1

Example G 100 g of a commercially available copolymer of 60% by weight of styrene and 40% by weight of acrylic acid (molecular weight Mn=1200) were dissolved in a mixture of 372 g of water, 19 g of 25% strength $NH_3$ solution and 80 g of the 82% strength solution of the ethoxylated ethylenediamine A2 with stirring.

Active ingredients: 30%

Viscosity: 15 mPas pH: 8.5

Example H

To 470 g of a commercially available 35% strength aqueous polyacrylic acid solution (molecular weight Mw=100,000, pH=0.9, viscosity 140 mpas) were added at room temperature 33 g of the 76% strength aqueous solution A4.

Active ingredients: 39.2%

Viscosity: 1910 mPas pH: 4.2

Gel content:
  The mixture was poured into a silicone mold and dried at 50° C. in a through-circulation oven. The thickness of the resulting film was within the range from 0.5 to 1 mm.
  About 1 g of the film thus produced are cured in air at 130° C. for 15 min. The cured film is aged in distilled water at 230C. for 48 h.
  The weight of the water-aged film after drying to a constant weight relative to the weight of the film before water aging is used to calculate the gel content (i.e. the completely or partially crosslinked, water-insoluble content) of the binder. In the present example it is 74%.

Example I 250 g of the 50% strength aqueous solution of the copolymer of Example B and 290 g of a 43.5% strength aqueous solution of a free-radically polymerized copolymer (K value of the 1% strength by weight aqueous solution=30; pH=0.5; viscosity=2100 mpas at 250 $sec^{-1}$), consisting of 80% by weight of acrylic acid and 20% by weight of maleic acid, were mixed. To this mixture were added at room temperature 50 g of the 75% strength solution of the ethoxylated polyethyleneimine A1.

Active ingredients: 49.8% by weight

Viscosity: 3700 mPas pH: 2.0

Gel content: 85%

Example J

To 500 g of the 50% strength aqueous solution of the copolymer of Example B was added with stirring at room temperature a mixture of 50 g of the 75% strength solution of the ethoxylated polyethyleneimine A1 and 37.5 g of triethanolamine over 5 min.

Active ingredients: 55.3% by weight
viscosity: 960 mpas
pH: 2.7
Gel content: 83%

Water Absorption

Test specimens 2.5×2.5 cm in size are aged in water at 23° C. for 2 h. The percentage weight increase of the specimens is determined by weighing the specimens after the superficially adhering water has been dabbed off.

Thickness Swelling

In the same way, the percentage increase in the board thickness during water aging is determined by means of a vernier

| Sample | Binder | Density of board (g/cm$^3$) | Bending strength at 23° C./60° C. (N/mm$^2$) | Modulus of elasticity at 23° C./60° C. (N/mm$^2$) | Water absorption after 2 h (%) | Thickness swelling after 2 h (%) |
|---|---|---|---|---|---|---|
| 1 | B | 0.74 | 33/21 | 3560/2380 | 53 | 21 |
| 2 | C | 0.84 | 29/19 | 3470/2220 | 20 | 16 |
| 3 | H | 0.86 | 25/20 | 3100/2410 | 44 | 21 |
| 4 | J | 0.74 | 31/20 | 3740/3120 | 55 | 28 |
| 5 | K | 0.82 | 28/24 | 3430/2650 | 42 | 25 |
| 6 | comp A | 0.70 | 21/11 | 2590/1840 | 88 | 50 |

Example K

To 500 g of a 25% strength solution of a copolymer of Example E are added at room temperature with stirring 46.8 g of the 75% strength solution of the propoxylated 1,2-ethylenediamine A3.

Comparative Example A (Example 14, Sample 33 of EP-A-651 088)

100 g of polyacrylic acid (Mw=10,000, 25 mol % of the carboxylic acid groups neutralized with NaOH), 10 g of triethanolamine and 5 g of sodium hypophosphite are combined to prepare a 40% strength aqueous solution.

pH: 4.5
Viscosity: 130 mpas
Active ingredients: 40% by weight
Gel content: 0%

Comparative Example B
commercially available phenol-formaldehyde resin: "Kauresin Leim 259 flüssig"

Example L
Manufacture of Chipboard

In a tumble mixer, 100 g of wood chips (average size: 1.2 mm, 95% by weight of the chips have a size within the range from 0.3 mm to 2.5 mm) are admixed over 1 min with a sufficient amount of the stated aqueous binder that the weight content of the active ingredients of the binder is 10%, based on the dry weight of the wood chips.

Following a mixing time of 2 min, the binder-impregnated wood chips are sprinkled into a press mold 20×20 cm in size and predensified. The chips are then pressed for 10 min with a laboratory press at a molding pressure of 50 bar and a press temperature of 190° C. to form a chipboard having a density of from about 0.6 to 0.9 g/cm$^3$ and a thickness within the range from 6 to 8 mm.

Testing of Chipboard

The chipboard bending strength and modulus of elasticity $E_b$ are determined in accordance with DIN 52362.

Example M
Manufacture and Testing of Cork Chipboard

In a tumble mixer, 65 g of cork chips (bulk density 65 g/l, average size: 1 mm) are admixed with 25 g of 46.5% strength binder composition of Example F. Tie binder-impregnated cork chips are dried at 70° C. and then pressed at 190° C. in a mold 15×15 cm in size for 5 min under a pressure of 50 bar to form sheets 2 mm in thickness. The mechanical properties of the sheets were tensile tested in accordance with DIN 53504.

Density: 0.14 g/cm$^3$
Breaking strength: 5.2 N/mm$^2$
Breaking extension: 2%

Example N
Manufacture and Testing of Sheets Produced from Flax Fiber Mats 100 g of the binder composition G are mixed with 4 g of the 50% strength aqueous hydrophobicizing agent composition Mobilcer 736. A flax fiber mat (basis weight 410 g/m$^2$) is impregnated with this mixture so that the mat comprises 25% by weight of active ingredients, based on the weight of the dry fibers. Three layers of the impregnated mat are pressed in a heated press at a press temperature of 190° C. for 3 min to form sheets 2 mm in thickness.

Density: 0.83 g/cm$^3$
Bending strength at 23° C.: 48 N/mm$^2$
Bending strength at 100° C.: 34 N/mm$^2$
Modulus of elasticity at 23° C.: 5860 N/mm$^2$
Modulus of elasticity at 100° C.: 4360 N/mm$^2$
Water absorption after 24 h: 30%
Thickness swelling after 24 h: 28%

Example O
Coating and Testing of Mineral Fiberboard

A commercially available 16 mm thick acoustic board comprising starch as binder was brush-coated on the decor face with the coating compositions indicated in the table.

The amount applied was in each case 100 g of active constituents/m². The boards were dried at 200° C. for 15 min.

The bending modulus of the uncoated and coated boards was tested at 23° C. and 60° C. in accordance with DIN 53362. The dimensions of the test specimens were 25×5×1.6 cm.

Test Results

| Coating composition | Modulus of elasticity $E_b$ at 23° C. (N/mm²) | Modulus of elasticity $E_b$ at 60° C. (N/nm²) |
|---|---|---|
| None | 130 | 120 |
| Example D | 210 | 200 |
| Example I | 190 | 180 |

Example P
Preparation of Test Specimens from Fused Basalt Powder Beads 300 g of fused basalt powder beads (obtained from the manufacture of mineral fiberboards from the melt, average particle size 0.2 mm) were mixed with binder composition at room temperature (5% by weight of binder active substance based on beads). The moist mixture was shaped into a test specimen (Fischer bar) 17×2.3×2.3 cm in size and cured at 200° C. for 2 h.

The bending strength of the Fischer bars thus produced is determined in the dry state at 23° C. in a three-point bending test.

A further Fischer bar is aged for one hour in distilled water at 23° C. The water taken up by the test specimen, reported in weight percent of the dry weight, and its bending strength in the wet state are determined.

| Sample | Binder | Water absorption after 1 h (%) | Bending strength dry (N/mm²) | Bending strength wet (N/mm²) |
|---|---|---|---|---|
| 1 | B | 1.7 | 580 | 590 |
| 2 | E | 5.7 | 820 | 940 |
| 3 | I | 10.5 | 550 | 570 |
| 4 | J | 4.1 | 880 | 630 |
| 5 | comp B | 22.0 | 850 | 690 |

We claim:

1. An aqueous thermally curable composition comprising component
   (1) at least one water-soluble, linear or branched aliphatic compound containing at least two functional amino groups of the structure (a) or of the structure (b)

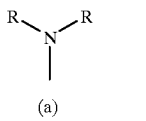

where R is hydroxyalkyl and R' is alkyl, per molecule, component
   (2) an addition polymer containing from 5 to 100% by weight of units derived from at least one ethylenically unsaturated mono- or dicarboxylic acid obtained by free-radical polymerization and being essentially free of carboxylic anhydride structures, and
   (3) water.

2. A composition as claimed in claim 1, wherein component (1) comprises at least one compound of the formula I

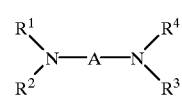

where
   A is $C_2$–$C_{18}$-alkylene, unsubstituted or substituted by one or more groups selected independently of each or one another from the group consisting of alkyl, hydroxyalkyl, cycloalkyl, OH and $NR^6R^7$, where $R^6$ and $R^7$ are independently of each other H, hydroxyalkyl or alkyl, uninterrupted or interrupted by one or more oxygen atoms and/or $NR^5$ groups, where $R^5$ is H, hydroxyalkyl, $(CH_2)_nNR^6R^7$, where n is from 2 to 5 and $R^6$ and $R^7$ are each as defined above,
   or A is a radical of the formula:

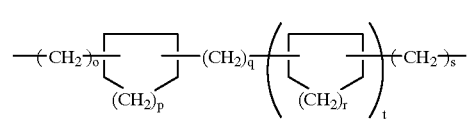

where
   o, q and s are each independently of the others 0 or an integer from 1 to 6,
   p and r are independently of each other 1 or 2, and t is 0, 1 or 2,
   radicals

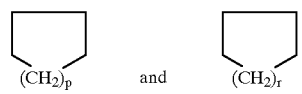

are unsubstituted or substituted by 1, 2 or 3 alkyl radicals, and
   $R^1$, $R^2$, $R^3$ and $R^4$ are each independently of the others H, hydroxyalkyl, alkyl or cycloalkyl.

3. A composition as claimed in claim 1, wherein component (1) is selected from at least one compound of the formula Ia:

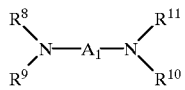

where
   $A_1$ is $C_2$–$C_{12}$-alkylene, unsubstituted or substituted by at least one alkyl group and/or at least one $NR^{12}R^{13}$ group, where $R^{12}$ and $R^{13}$ are independently of each other alkyl or hydroxyalkyl, and
   $R^8$, $R^9$, $R^{10}$ and $R^{11}$ are each independently of the others hydroxyalkyl or H, or one of $R^8$ and $R^9$ and/or one of $R^{10}$ and $R^{11}$ is alkyl or cycloalkyl.

4. A composition as claimed in claim 1, wherein component (1) is selected from at least one compound of the formula Ib:

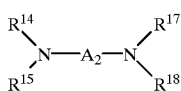

(Ib)

where

A$_2$ is C$_2$–C$_8$-alkylene which is interrupted by at least one NR$^{18}$ group, where R$^{18}$ or each of the R$^{18}$ radicals independently is hydroxyalkyl or alkyl, and R$^{14}$, R$^{15}$, R$^{16}$ and R$^{17}$ are each independently of the others hydroxyalkyl or H.

5. A composition as claimed in claim 1, wherein component (1) is selected from at least one compound of the formula Ic:

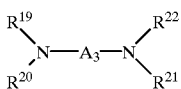

(Ic)

A$_3$ is C$_2$–C$_8$-alkylene which is interrupted by at least one NR$^{23}$ group, R$^{19}$, R$^{20}$, R$^{21}$ and R$^{22}$ are each independently of the others alkyl, uninterrupted or interrupted by at least one NR$^{23}$ group and/or unsubstituted or substituted by at least one NR$^{25}$R$^{24}$ group, R$^{23}$ is H, hydroxyalkyl or —R$^{26}$NR$^{24}$R$^{25}$, R$^{24}$ and R$^{25}$ are independently of each other H, hydroxyalkyl or —R$^{26}$NR$^{24}$R$^{25}$, and R$^{26}$ is ethylene or propylene, and (on average) at least 30% of the N atoms bear a hydroxyalkyl group.

6. A composition as claimed in claim 5, wherein component (1) is a reaction product of a polyethyleneimine with ethylene oxide.

7. A composition as claimed in claim 1, wherein component (1) is selected from at least one compound of the formula Ie:

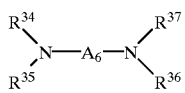

(If)

where

A$_5$ is C$_6$–C$_{18}$-alkylene which is interrupted by at least one NR$^{31}$ group, where R$^{31}$ is (CH$_2$)$_n$NR$^{33}$R$^{32}$ or alkyl which is uninterrupted or interrupted by at least one NR$^{31}$ group, n is 2 or 3, and R$^{27}$, R$^{28}$, R$^{29}$, R$^{30}$, R$^{31}$, R$^{32}$ and R$^{33}$ are each independently of the others hydroxyalkyl or H.

8. A composition as claimed in claim 1, wherein component (1) is selected from at least one compound of the formula If:

(If)

where

A$_6$ is C$_2$–C$_{12}$-alkylene which is interrupted by at least one oxygen atom, and R$^{34}$, R$^{35}$, R$^{36}$ and R$^{37}$ are each independently of the others hydroxyalkyl or H.

9. A composition as claimed in claim 1, wherein component (1) comprises polyalkanolamines obtainable by self-condensation of dialkanolamines and/or trialkanolamines in the presence or absence of mono- or polyhydric alcohols or mono- or polyacid amines.

10. A composition as claimed in claim 1, wherein hydroxyalkyl is hydroxypropyl or hydroxyethyl.

11. A composition as claimed in claim 1, wherein component (2) is polymerized from at least one compound selected from the group consisting of acrylic acid, methacrylic acid, crotonic acid, fumaric acid, maleic acid, 2-methylmaleic acid and itaconic acid.

12. A composition as claimed in claim 11, wherein component (2) is at least partly polymerized from maleic acid.

13. A composition as claimed in claim 1, wherein component (2) contains up to 95% by weight of units derived from ethylenically unsaturated monomers other than said ethylenically unsaturated mono- or dicarboxylic acid.

14. A composition as claimed in claim 13, wherein the ethylenically unsaturated monomers are selected from the group consisting of esters of (meth)acrylic acid with C$_1$–C$_{12}$-monoalcohols or -dialcohols, aromatic vinyl compounds, butadiene, vinyl esters of aliphatic C$_2$–C$_{12}$-monocarboxylic acids, (meth)acrylonitrile, (meth) acrylamide, N—C$_1$–C$_6$-alkyl(meth)acrylamides and N,N-di-C$_1$–C$_6$-alkyl(meth)acrylamides.

15. A composition as claimed in claim 1, wherein the molar ratio of carboxyl groups in component (2) to the hydroxyl groups in component (1) is within the range from 20:1 to 1:5.

16. A composition as claimed in claim 1 further comprising a dialkanolamine and/or a trialkanolamine.

17. A composition as claimed in claim 1 further comprising a reaction accelerant.

18. A binder comprising a composition as claimed in claim 1.

19. A shaped article obtained by impregnating a substrate with a composition as claimed in claim 1 or a binder as claimed in claim 18 and shaping and curing the impregnated substrate.

20. An article as claimed in claim 19, comprising boards of chipboards, fiberboards, insulants or fiber webs.

21. A shaped article obtained by impregnating a substrate with a binder as claimed in claim 18 and curing the impregnated substrate.

22. A composition as claimed in claim 1, wherein component (2) contains from 20 to 100% by weight of units derived from at least one ethylenically unsaturated mono- or dicarboxylic acid.

* * * * *

UNITED STATES PATENT AND TRADEMARK OFFICE
CERTIFICATE OF CORRECTION

PATENT NO. : 6,114,464

DATED : September 5, 2000

INVENTOR(S): Bernd Reck et al.

It is certified that an error appears in the above-identified patent and that said Letters Patent is hereby corrected as shown below:

On the title page, item [54] and at the top of Column 1, the Title is incorrectly listed. The title should be:

--[54] THERMOSETTING AQUEOUS COMPOSITIONS--

On the title page, item [75], the 6th Inventor's address is incorrectly listed. The Inventor's should read as follows:

--[75] Bernd Reck, Grünstadt; Eckehardt Wistuba, Bad Dürkheim; Wilhelm Friedrich Beckerle, Bobenheim-Roxheim; Jürgen Mohr, Grünstadt; Axel Kistenmacher, Ludwigshafen, all of Germany; Joachim Roser, Bruxelles, Belgium--

On the title page, item [30] is incorrectly listed. The Foreign Application Priority Data should be:

--[30] Foreign Application Priority Data

May 29, 1996 [DE] Germany.....................196 21 573--

Signed and Sealed this

First Day of May, 2001

Attest:

NICHOLAS P. GODICI

*Attesting Officer*  *Acting Director of the United States Patent and Trademark Office*

UNITED STATES PATENT AND TRADEMARK OFFICE
CERTIFICATE OF CORRECTION

PATENT NO. : 6,114,464
DATED : September 5, 2000
INVENTOR(S) : Bernd Reck et al.

It is certified that error appears in the above-identified patent and that said Letters Patent is hereby corrected as shown below:

Column 5,
Formula (Ib), "

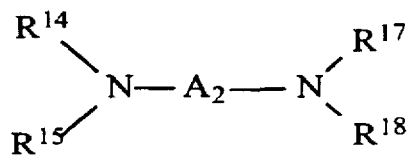

"

should read --

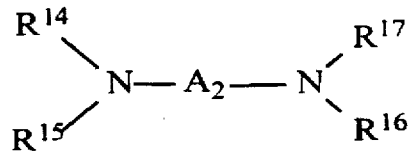

--;

Line 32, "two $NR^5$ groups." should read -- two $NR^{18}$ groups. --.

Column 6,
Line 36, "$NR^{23}$ group, $R^{19}$, $R^{20}$, $R^{21}$ and $R^{22}$ are each" should read -- $NR^{23}$ group, where $R^{23}$ is H, hydroxyalky or $CH_2CH_2NR^{25}R^{24}$, $R^{19}$, $R^{20}$, $R^{21}$ and $R^{22}$ are each --;
Line 40, "$R^{23}$ is II" should read -- $R^{23}$ is H --;
Line 50, "two $NR^5$ groups." should read -- two $NR^{23}$ groups. --;
Line 54, "elements $NR^6R^7$ and $NR^5$." should read -- elements $NR^{24}R^{25}$ and $NR^{23}$ groups. --.

UNITED STATES PATENT AND TRADEMARK OFFICE
CERTIFICATE OF CORRECTION

PATENT NO. : 6,114,464
DATED : September 5, 2000
INVENTOR(S) : Bernd Reck et al.

It is certified that error appears in the above-identified patent and that said Letters Patent is hereby corrected as shown below:

Column 7,
Formula at top,

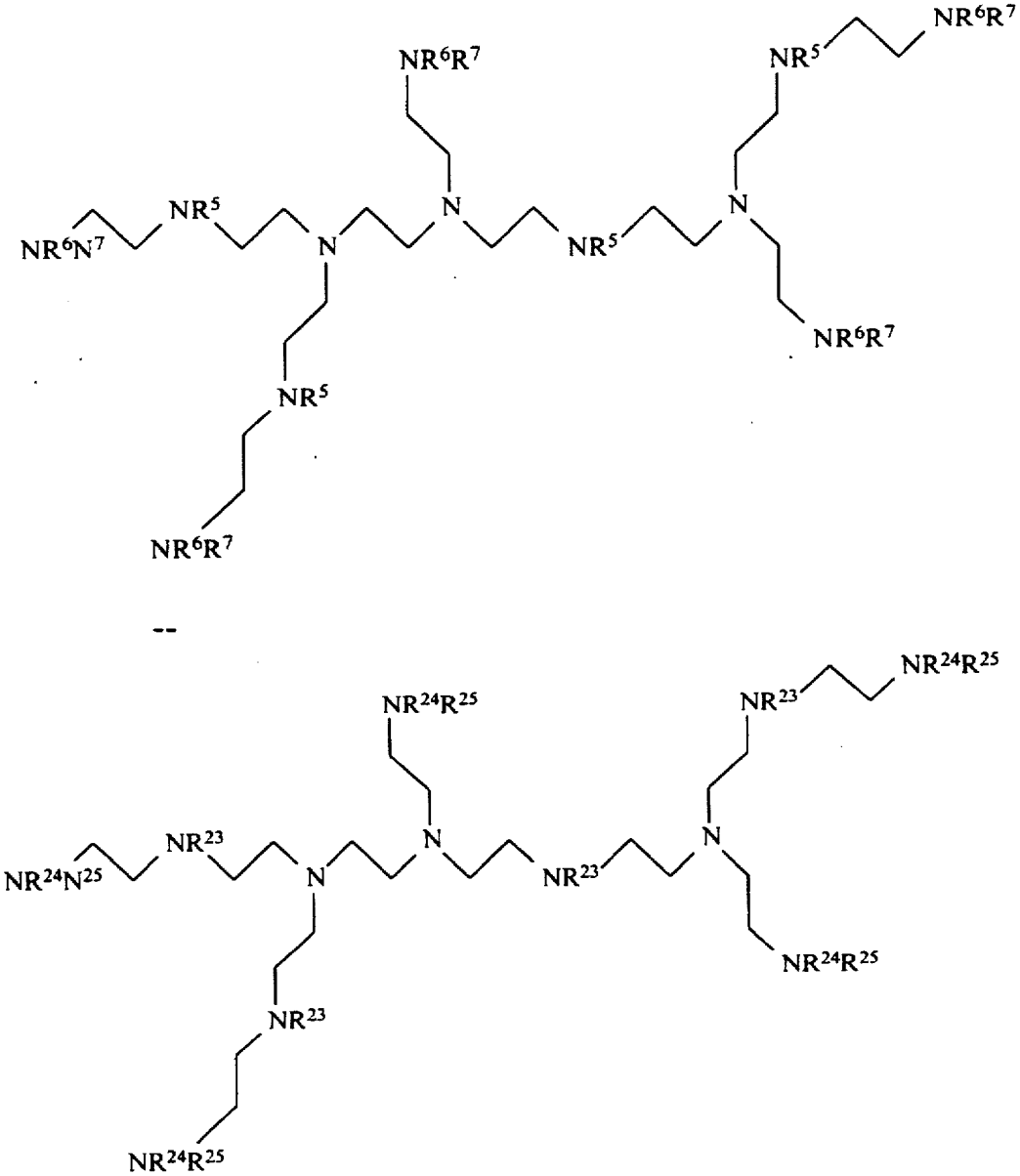

UNITED STATES PATENT AND TRADEMARK OFFICE
CERTIFICATE OF CORRECTION

PATENT NO. : 6,114,464
DATED : September 5, 2000
INVENTOR(S) : Bernd Reck et al.

It is certified that error appears in the above-identified patent and that said Letters Patent is hereby corrected as shown below:

Column 7, cont'd,
Line 20, "$R^5$ is H, hydroxyethyl or —$R^8$ $NR^6R^7$ and $R^6$ and $R^7$ are" should read -- $NR^{23}$ is H, hydroxyethyl or —$R^{19}$ $NR^{24}R^{25}$ and $R^{24}$ and $R^{25}$ are --.
Line 21, "—$R^8$ $NR^6R^7$ and $R^8$ is" should read -- —$R^{19}$ $NR^{24}R^{25}$ and $R^{19}$ is --;
Line 38, "$NR^{31}$ group," should read -- $NR^{31}$ group, where $R^{29}$ is $(CH_2)_n R^{33}R^{32}$ or alkyl, and/or substituted by at least one $NR^{33}R^{32}$ group, --.

Column 20,
Line 22, "succession of" should read -- succession or --.

Column 21,
Line 14, "at 250 $sec^{-1}$." should read -- at 250 $sec^{-1}$). --.

Column 22,
Line 5, "fiber mate This" should read -- fiber mat. This --;
Line 19, "less th an" should read -- less than --.

Column 24,
Line 62, delete -- EO=ethylene oxide --;
Line 63, delete -- PO=propylene oxide --.

Column 31,
Formula (Ib), "

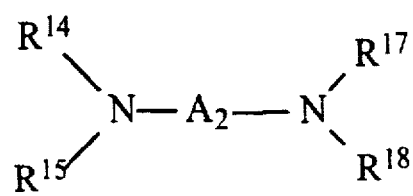

should read --

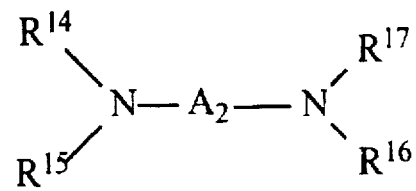

--;

UNITED STATES PATENT AND TRADEMARK OFFICE
CERTIFICATE OF CORRECTION

PATENT NO.    : 6,114,464
DATED         : September 5, 2000
INVENTOR(S)   : Bernd Reck et al.

It is certified that error appears in the above-identified patent and that said Letters Patent is hereby corrected as shown below:

Column 31, cont'd,
Formula (If),

" 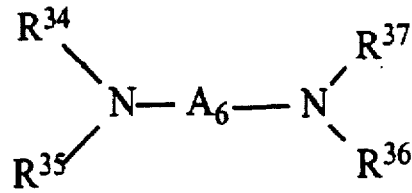 (If) "

should read
--formula (Ie)                                                                                 --;

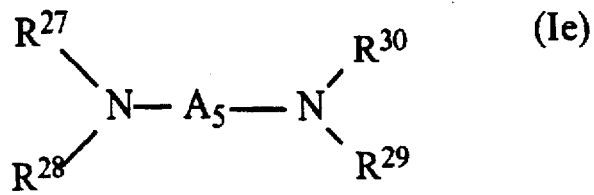

Signed and Sealed this

Fifth Day of February, 2002

Attest:

Attesting Officer

JAMES E. ROGAN
Director of the United States Patent and Trademark Office